3,053,924
BATTERY ELECTRODE AND METHOD OF MAKING THE SAME
Howard Jerome Strauss, Abington Township, Montgomery County, and Curtice C. White, Johnsville, Pa., assignors to The Electric Storage Battery Company, a corporation of New Jersey
No Drawing. Filed Mar. 23, 1959, Ser. No. 800,918
6 Claims. (Cl. 136—30)

The present invention relates to battery electrodes and methods of making the same. More specifically, the present invention is concerned with negative electrodes for storage batteries which have heretofore been subject to growth of surface projections or treeing during operation and has for an object the reduction of the rate of growth of surface projections with a resulting increase in the life of the battery.

While the present invention is illustrated in connection with a silver-zinc battery having an alkaline electrolyte, it should be understood that this is merely for the purpose of illustration and that the present invention is applicable to other type electrode systems wherein similar growth phenomena will occur as, for example, nickel-zinc and nickel-cadmium. In a silver-zinc battery system, the negative active material in crystalline form may appear as a protuberance over the face of the zinc-negative electrode, such protuberances eventually piercing the diaphragm separating the zinc electrode and the associated silver positive electrode to form a low resistance path therebetween which in effect, short circuits the electrodes.

Although the phenomena which results in the aforementioned growths is not completely understood, it is believed that zinc dissolved in the electrolyte migrates and, during subsequent recharging, is plated out on the negative plate in the areas of greatest current concentrations. Such areas of current concentration are developed because during the charging of a battery, the zinc oxide in the negative plate is converted to metallic zinc, the chemical reduction first occurring at the surface of the grid and gradually progressing outward therefrom. Any irregularity on the surface of the electrode grid will result in a region of lowered electrical resistance which causes the current density in that region to be higher than in adjacent regions. A concentration of current in a localized area tends to increase the rate of conversion of zinc oxide to zinc in such an area. The metallic zinc in many cases in such an area is composed of large, hard crystals that are not completely converted to zinc oxide on subsequent discharge. Since the large zinc crystals are more electrically conductive than the surrounding particles of zinc oxide, the charge current tends to build up in that area. The dissolved zinc tends to be plated on these large crystals of zinc, thus, continually building up projections in those areas. These projections will eventually, after several cycles of charge and discharge, pierce the dividing diaphragm or separator and may even make direct contact with the associated positive plate, thus short circuiting the cell.

In addition to tending to pierce the diaphragm separating the plates, such protuberances of metallic zinc tend to become detached and fall to the bottom of the battery case and fail to take any further part in the normal electro-chemical reaction of the battery. Such material represents a definite loss in negative active material and unless an excess of such material is provided, will result in a loss of battery capacity.

It is known in the art, that the pores of cellulosic materials are of such size as to prevent by selective mechanical screening, the passage therethrough of zinc and other metallic ions while permitting the passage therethrough of electrolyte ions. Accordingly, it is conventional practice to wrap negative zinc electrodes in several layers of cellophane to immobilize the zinc which becomes dissolved in the battery electrolyte. While such wrappings have been satisfactory to a limited degree, they tend to lose mechanical strength in the strong oxidizing environment in the battery. In addition, such wrapping arrangements are generally costly to provide and impede irrigation of the enveloped electrodes by the electrolyte.

Accordingly, it is an object of the present invention to provide a new and improved means of immobilizing zinc ions which become dissolved in battery electrolyte.

Still another object of the present invention is to provide a means for inhibiting the loss of active material from an electrode in which the active material is soluble in the electrolyte.

A further object of the present invention is to provide an electrode in which a cellulosic material is deposited within the pores of the electrode itself to substantially limit the migration of dissolved zinc to within the pores themselves.

In accordance with the present invention, a formed zinc electrode is impregnated with a solution of cellulose xanthate and the cellulose regenerated within the pores of the plate by treatment with sulphuric acid or by other means. In this manner, there is precipitated within the pores of the electrode, a material which essentially acts as a diaphragm, limiting the migration of dissolved zinc to the region of its origin thereby considerably extending the life of the electrode by reducing treeing and loss of active material.

Other objects and advantages of the present invention will be readily apparent from the following detailed description of preferred embodiments thereof.

In one form of the present invention, a formed zinc electrode is impregnated with a solution of a cellulosic base filler material and the filler deposited within the pores of the electrode. Since the cellulosic material is itself porous within the pores of the electrode, being what might be termed submicroporous in size, there is produced within the pores of the plate a porous filler of even smaller pore size. The pores of the cellulosic material are of such size as actually to prevent by selective mechanical screening, the passage therethrough of all ions larger in size than the electrolytic ions.

For the purposes of the present invention, the zinc electrode may be constructed in any conventional manner such as, for example, pressing layers of powdered zinc into a suitable grid to structurize the zinc or by sintering pressed zinc oxide and electrochemically reducing the oxide to metallic zinc. It may also comprise finely divided particles of metallic zinc structurized by means of a suitable binder.

Preferably, there is used as a base material for the impregnant, a cellulosic material that, conveniently, may be in the form of cotton linters. These linters are steeped in an aqueous solution of 3% NaOH for from about five hours to about ten hours in an atmosphere of steam to convert the linters to alkali cellulose in accordance with the following reaction:

$$(C_6H_9O_4.OH)_x + xNaOH \longrightarrow (C_6H_9O_4.ONa)_x + xH_2O$$
Cellulose              Alkali cellulose The alkali cellulose is then dried at a temperature of from about 100° C. to 110° C. for a short period of time, in the nature of about two hours, and further treated with carbon disulfide to produce a heavy, viscous cellulose xanthate solution which is then used to impregnate the porous zinc electrode. The reaction of alkali cellulose and carbon disulfide is as follows:

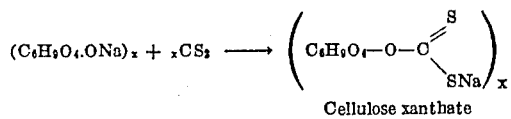
Cellulose xanthate

The electrode is then dipped into the cellulose xanthate solution and the latter is permited to permeate the pores thereof until a condition of complete saturation is reached after which the electrode is removed from the solution. A treatment with a 4%–5% solution of sulfuric acid will then regenerate the cellulose within the pores of the electrode.

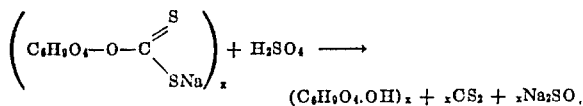

After such treatment the electrode is immersed in a weak basic solution, such as 3% NaOH to neutralize the acid and, after washing and drying, it is ready for insertion into the battery.

If it is desired for production purposes to eliminate the acid treatment step that is required in the regeneration phase of the foregoing process as well as the neutralization treatment with NaOH, the impregnating solution can be prepared as follows:

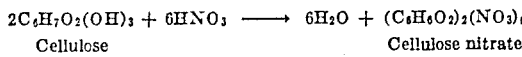
Cellulose        Cellulose nitrate

It will be understood that the nitration process is incomplete in order that the nitrate of cellulose known as "Pyroxylin" is produced. This product is then dissolved in a mixture of ether and alcohol to form a collodion solution with which the electrode is then impregnated. After complete impregnation, a simple drying operation to remove the solvent is the only step necessary to prepare the electrode for actual use.

The examples given above are merely exemplary of processes by which the regeneration of the cellulose in the pores of the electrode may be accomplished and are merely presented in order to illustrate how the invention may be applied. It will be understood by those skilled in the art that the cellulose material deposited within the pores of the electrode, in addition to acting as a physical barrier to the passage therethrough of metal ions or molecules, also will tend to add physical strength to the electrode. It will also be understood that while it still may be desirable to envelope the electrode of the present invention in a cellulosic type wrapper, that as a result of the cellulosic material within the pores of an electrode, such wrappings may be greatly reduced. In addition, the teachings of the present invention will permit such wrappings to be applied in such a manner as not to interefere with the proper irrigation of the electrodes with the electrolyte.

What is claimed is:
1. A method of inhibiting the growth of surface projections on zinc storage battery electrode comprising the steps of impregnating a porous formed zinc electrode with a solution of a cellulosic filler material and precipitating a microporous cellulosic filler material from said solution within the pores of the electrode.
2. The method of claim 1 wherein the cellulosic solution is selected from the group consisting of xanthate solutions and collodion solutions and the cellulosic material is selected from the group consisting of cellulose and cellulose nitrate.
3. A method of inhibiting the growth of surface projections in a storage battery electrode of the type in which the active material is subject to growth of surface projections, comprising the steps of impregnating said electrode with a cellulose xanthate solution, regenerating cellulosee within the pores of said electrode and washing and drying said electrode.
4. A method of impregnating a porous battery electrode with a cellulosic material which comprises solubilizing cellulose to form a solution, impregnating said electrode in said solution and regenerating cellulose within the pores of said matrix.
5. A battery electrode produced by the method of claim 1.
6. A battery electrode produced by the method of claim 3.

References Cited in the file of this patent
UNITED STATES PATENTS

| | | |
|---|---|---|
| 565,140 | Hubner | Aug. 4, 1896 |
| 756,176 | Maygret | Mar. 29, 1904 |
| 2,684,989 | Wilburn | July 27, 1954 |
| 2,694,743 | Ruskin et al. | Nov. 16, 1954 |
| 2,708,683 | Eisen | May 17, 1955 |
| 2,724,011 | Strauss | Nov. 15, 1955 |
| 2,737,541 | Coolidge | Mar. 6, 1956 |
| 2,738,375 | Schlotter | Mar. 13, 1956 |
| 2,838,590 | Garime | June 10, 1958 |